United States Patent
Wang et al.

(10) Patent No.: US 9,515,571 B2
(45) Date of Patent: Dec. 6, 2016

(54) CURRENT-RECTIFYING DEVICE, GATE-BOOSTING RECTIFIER AND METHOD OF PERMITTING CURRENT TO FLOW IN ONE DIRECTION WHEN DRIVEN BY AC INPUT VOLTAGE

(71) Applicant: National Chiao Tung University, Hsinchu (TW)

(72) Inventors: Yu-Jiu Wang, Hsinchu (TW); I-No Liao, Hsinchu (TW); Chao-Han Tsai, Hsinchu (TW); Chatrpol Pakasiri, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 50 days.

(21) Appl. No.: 14/591,435

(22) Filed: Jan. 7, 2015

(65) Prior Publication Data
US 2015/0194907 A1 Jul. 9, 2015

Related U.S. Application Data

(60) Provisional application No. 61/924,324, filed on Jan. 7, 2014.

(51) Int. Cl.
*H02M 7/219* (2006.01)
*H02M 7/25* (2006.01)
*H02M 7/19* (2006.01)

(52) U.S. Cl.
CPC ............... *H02M 7/25* (2013.01); *H02M 7/19* (2013.01)

(58) Field of Classification Search
CPC ............... H02M 3/02; G05F 3/08; G05F 3/02; G05F 3/04
USPC ............ 327/427, 306, 330; 363/127, 17, 37
See application file for complete search history.

(56) References Cited

U.S. PATENT DOCUMENTS

| | | | | |
|---|---|---|---|---|
| 7,120,036 B2* | 10/2006 | Kyono | ............... | H02M 3/33592 363/21.06 |
| 7,869,231 B2* | 1/2011 | Cohen | ............... | H02M 3/33592 363/21.14 |
| 8,368,451 B2* | 2/2013 | Mulawski | ............ | H03K 17/007 327/308 |
| 2011/0241755 A1* | 10/2011 | Mulawski | ............ | H03K 17/007 327/427 |

* cited by examiner

*Primary Examiner* — Dinh T Le
(74) *Attorney, Agent, or Firm* — Mintz Levin Cohn Ferris Glovsky and Popeo, P.C.; Peter F. Corless; Steven M. Jensen (57) ABSTRACT

A current-rectifying device includes a switching component and an impedance transformer. A conductance between first and second nodes of the switching component is controlled based on a voltage between high-impedance control and control-reference nodes of the switching component to determine an amount of current that is permitted to flow between the first and second nodes. The impedance transformer includes a positive input node electrically connected to one of the first and second nodes based on AC voltage swings, a negative input node, a positive output node electrically connected to the high-impedance control node, and a negative output node, and which senses an AC voltage swing derived from the AC input voltage with the positive input node and the negative input node, and provides an AC voltage swing between the high-impedance control and control-reference nodes that is greater than the AC voltage swing derived from the AC input voltage.

27 Claims, 8 Drawing Sheets

CURRENT-RECTIFYING DEVICE, GATE-BOOSTING RECTIFIER AND METHOD OF PERMITTING CURRENT TO FLOW IN ONE DIRECTION WHEN DRIVEN BY AC INPUT VOLTAGE

CROSS-REFERENCE TO RELATED APPLICATION

This application claims under 35 U.S.C. §119(a) the benefit of U.S. Provisional Application No. 61/924,324, filed Jan. 7, 2014, the entire contents of which are incorporated herein by reference.

BACKGROUND OF THE INVENTION

1. Field of the Invention

The invention relates to rectifying devices, and, more particularly, to a rectifying device which permits a current to flow in favor of one direction when driven by an AC input voltage and to an in-phase gate-boosting rectifier (IGR) which converts an AC input voltage to an output DC current based on the rectifying device.

2. Description of Related Art

In the application of RF-to-DC rectifiers, the dimensions of antenna can be reduced by increasing operating frequency. However, as the frequency increases, the sensitivity of the rectifiers drops quickly because the parasitic capacitance from the passive and the active devices starts to dominate.

In order to improve the high-frequency performance of the rectifiers, a diode with reduced forward voltage drop and reverse leakage current is desired to improve sensitivity. In some approaches, a two-terminal diode can be implemented using a diode-connected MOSFET, and the forward voltage drops can be reduced by reducing the rectifying a threshold voltage of a transistor. However, due to the threshold voltage issue, the output current of the transistor diode will be generated only when an instantaneous $V_{in}$ is greater than the MOSFET threshold voltage $V_{th}$, which greatly influences the sensitivity.

Although the threshold voltage $V_{th}$ can be reduced by providing a gate bias voltage, a large bias voltage not only reduces effective threshold voltage, but also increases reverse leakage current. Moreover, since all internal voltages are initially zero, the input voltage swing still needs to be higher than the threshold voltage $V_{th}$ for starting up.

In order to generate a larger MOSFET gate voltage swing from the input voltage swing, an inductive peaking method has been proposed. The inductive peaking method approach utilizes an inductor to generate a larger gate voltage swing, so as to address to the starting up issue. However, in this method the gate-source voltage $V_{GS}$ and drain-source voltage $V_{DS}$ are not in phase, such that excessive reverse leakage current will be generated. Also, the input impedance of the rectifier is low due to a series gate inductor and gate capacitor resonant circuit, and such low resonant impedance will shunt between drain and source and reduce the voltage swing of $V_{DS}$.

From the foregoing, how to find a way to provide a diode with reduced forward voltage drop and reverse leakage current becomes the objective being pursued by persons skilled in the art.

SUMMARY OF THE INVENTION

Given abovementioned defects of the prior art, the present invention provides a current-rectifying device, a gate-boosting rectifier, and a method of permitting current to flow in one direction when driven by an AC input voltage, and as a consequence to improve the performance of a rectifier.

In order to achieve abovementioned and other objectives, the present invention provides a current-rectifying device which permits a current to flow in favor of one direction when driven by an AC input voltage. The current-rectifying device comprises a switching component and an impedance transformer. The switching component includes a first node, a second node, a control-reference node and a high-impedance control node. A conductance between the first node and the second node is controlled based on a voltage between the high-impedance control node and the control-reference node, and an amount of a current that is permitted between the first node and the second node is thus determined. The impedance transformer comprises a positive input node, a negative input node, a positive output node and a negative output node. The positive input node is electrically connected to one of the first node and the second node based on AC voltage swings thereof, and the positive output node is electrically connected to the high-impedance control node. The impedance transformer senses an AC voltage swing derived from the AC input voltage with the positive input node and the negative input node, and provides an AC voltage swing between the high-impedance control node and the control-reference node that is greater than the AC voltage swing derived from the AC input voltage. An AC voltage swing between the first node and the second node is substantially in phase with the conductance therebetween to permit the current driven by an AC input voltage to flow in favor of the direction from the first node to the second node.

In an embodiment, the switching component is a field-effect transistor (FET), a bulk node of the FET serves as the control-reference node, and a gate node of the FET serves as the control node.

The present invention also provides a rectifier which converts AC signals to an output DC current, the rectifier comprising an AC input node, a first capacitor with one end electrically connected to the AC input node, a DC input node, a first current-rectifying device aforementioned, a DC output node, a second current-rectifying device aforementioned, a ground node, and a second capacitor electrically connected across the DC output node and the ground node. The first node of the first current-rectifying device is electrically connected to the DC input node, and the second node of the first current-rectifying device is electrically connected to the other end of the first capacitor. Also, the first node of the second current-rectifying device is electrically connected to the other end of the first capacitor, and the second node of the second current-rectifying device is electrically connected to the DC output node.

Moreover, the present invention provides a multi-stage rectifier, which converts AC signals to an output DC current, the multi-stage rectifier comprising a multi-stage AC input node, a multi-stage DC positive output node, a multi-stage DC negative output node, a first rectifier aforementioned, and a second rectifier aforementioned. The input DC node of the first rectifier is electrically connected to the multi-stage DC negative output node. The output DC node of the first rectifier is electrically connected to the DC input node of the second rectifier, and the DC output node of the second rectifier is electrically connected to the multi-stage DC positive output node, and wherein the AC input nodes of the first and second rectifiers are electrically connected to the multi-stage AC input node.

The present invention further provides a method of permitting a current to flow in favor of one direction when driven by an AC input voltage, comprising: providing a switching component that has a first node, a second node and a control node; electrically connecting the first node to the AC input; electrically connecting an impedance transformer to one of the first node and the second node based on AC voltage swings thereof; and outputting an AC voltage swing substantially in phase with a conductance of the switching component from the impedance transformer to the control node of the switching component.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

In the following, specific embodiments are provided to illustrate the detailed description of the present invention. Those skilled in the art can easily conceive the other advantages and effects of the present invention, based on the disclosure of the specification. The present invention can also be carried out or applied by other different embodiments.

Figure 1:
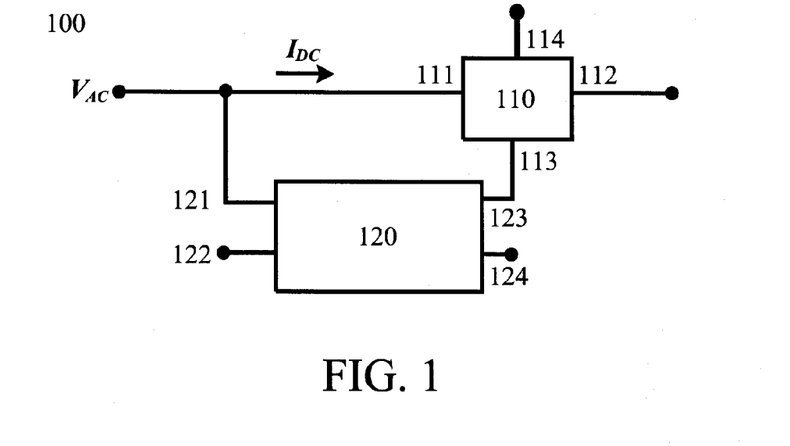
FIG. 1 is a system structure view of a current-rectifying device according to the present invention.

As shown in FIG. 1, a system structure view of a current-rectifying device 100 according to the present invention is illustrated. The current-rectifying device 100 includes a switching component 110 and an impedance transformer 120 which serves as a passive in-phase voltage multiplier network. The switching component 110 includes a first node 111, a second node 112, a high-impedance control node 113 and a control-reference node 114, for controlling an amount of a current $I_{DC}$ that flows through the first node 111 and the second node 112. For example, the conductance between the first node 111 and the second node 112 can be controlled based on a voltage between the high-impedance control node 113 and the control-reference node 114, such that an amount of the current $I_{DC}$ permitted to flow between the first node 111 and the second node 112 can be determined.

When an AC input voltage $V_{AC}$ is applied to the first node 111 and ac-coupled to the high-impedance control node 113, a voltage swing at the high-impedance control node 113 needs to be sufficiently large to permit the current $I_{DC}$ to flow from the first node 111 to the second node 112 due to a starting up problem caused by the threshold voltage of the switching component 110. Accordingly, the impedance transformer 120 having a positive input node 121, a negative input node 122, a positive output node 123 and a negative output node 124 is provided to amplify the AC input voltage $V_{AC}$ with a gain $A_v$ when a parasitic impedance from the high-impedance control node 113 is loaded, so as to increase the voltage swing between the high-impedance control node 113 and the control-reference node 114.

For example, the positive input node 121 is electrically connected to the first node 111, and the positive output node 123 is electrically connected to the high-impedance control node 113. It should be appreciated that the positive input node 121 is not limited to be electrically connected to the first node 111. For instance, if the voltage swing at the second node 112 is greater than the voltage swing at the first node 111, the positive input node 121 can be electrically connected to the second node 112 to better increase the voltage swing between the high-impedance control node 113 and the control reference node 114.

Given the above configuration, the impedance transformer 120 can sense an AC voltage swing derived from the AC input voltage $V_{AC}$ through the positive input node 121 and the negative input node 122, and provide a greater AC voltage swing between the high-impedance control node 113 and the control-reference node 114. As such, the conductance between the first node 111 and the second node 112 is substantially in phase with the voltage swing therebetween, so as to obtain a greater magnitude of the AC voltage swing between the control node 113 and the control-reference node 114.

In such way, an instantaneous current flowing from the first node 111 to the second node 112 is increased, and an instantaneous current flowing from the second node 112 to the first node 111 will be suppressed. In other words, an average current flowing through the switching component 110 in an AC cycle will be substantially in favor from the first node 111 which serves as an anode to the second node 112 which serves as a cathode.

In an embodiment, the negative input node 122 and the negative output node 124 are electrically connected.

Figure 2:
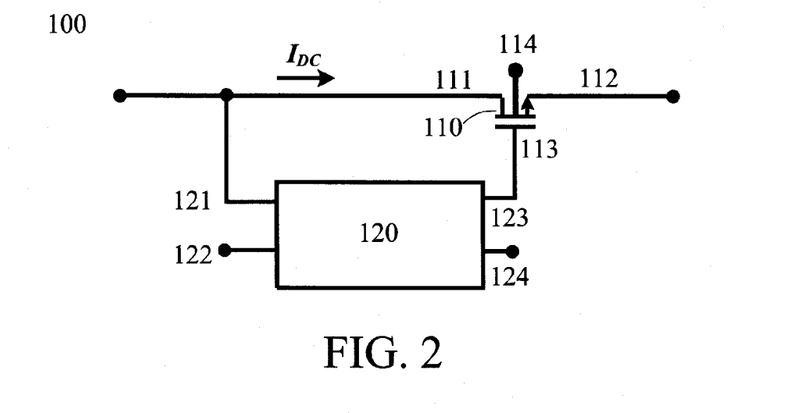
FIG. 2 is a schematic circuit of the current-rectifying device according to an embodiment of the present invention.

Preferably, as shown in FIG. 2, the switching component 110 is a field-effect transistor (FET), where a bulk node of the FET serves as the control-reference node 114, a gate node of the FET serves as the control node 113, a source node of the FET serves as one of the first node 111 and second nodes 112, and a drain node of the FET serves as the other one of the first node 111 and second nodes 112 according to the conducting type of the FET. For example, if the FET is a FET with N conducting type, the drain node may serve as the first node 111, and the source node may serve as the second node 112. Additionally, in an embodiment, the control reference node 114 is electrically connected to the first node 111 or the second node 112 upon the conducting type. That is, the control reference node 114 may share the same node with the first node 111 or the second node 112.

Figure 3:
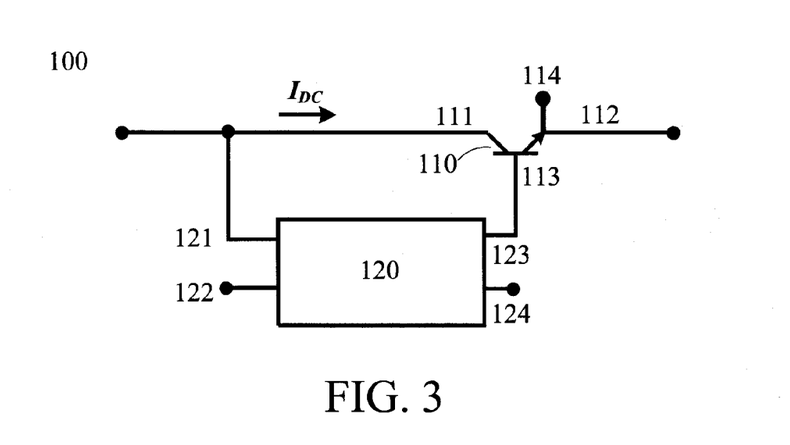
FIG. 3 is a schematic circuit of the current-rectifying device according to an embodiment of the present invention.

In an embodiment, as shown in FIG. 3, the switching component 110 can also be a bipolar-junction transistor (BJT), where a base node of the BJT serves as the high impedance control node 113, a collector node of the BJT serves as one of the first node 111 and second nodes 112, and an emitter node of the BJT serves as the other one of the first node 111 and second nodes 112 according to the conducting type of the BJT. In this embodiment, the control reference node 114 may be electrically connected to the emitter node of the BJT or a substrate of the BJT.

It should be noted, that in the case of PMOS MOSFET, or PNP BJT, the lower the gate voltage at 113, the higher the conduction between the first node 111 and the second 112. For example, when the switching component 110 is a PMOS that is controlled by a voltage swing across the high-impedance control node 113 and the first node 111 (i.e., $V_{gs}$ of the PMOS) and the control reference node 114 is AC-coupled to the first node 111, and the second node 112 is substantially DC-bypassed, the effective voltage gain $A_{v,eff}$ from the first node 111 to the voltage swing across the high-impedance control node 113 and the first node 111 (the control reference node 114) will be 1+|$A_v$|. In this case, $A_v$ will be out-of-phase with the input voltage swing at the first node 111, so the AC voltage swing between the first node 111 and the second node 112 is substantially in phase with the conductance therebetween. As such, if the gain $A_v$ is 2 with 180 degree phase shift, an effective gain $A_{v,eff}$ being 3 can still be obtained. Therefore, assuming that the AC input voltage $V_{AC}$ has a magnitude of 1 V and the voltage of the high-impedance control node 113 (i.e., a gate voltage of the PMOS MOSFET) is 2 V with 180 degree phase shift, the voltage swing across the high-impedance control node 113 and the first node 111 (also the control reference node 114) will be 1+|2|=3V. Furthermore, in the other case where the gain $A_v$ is 0.5, with the same 1V input voltage swing, the high-impedance control node 113 will have a voltage of 0.5 V with 180 degree phase shift, the voltage swing across the high-impedance control node 113 and the first node 111 (also the control reference node 114) is 1.5 V voltage which is still greater than the AC input voltage $V_{AC}$.

In an embodiment, the switching component 110 further comprises a bias node for adjusting the conductance between the first node and the second node. As such, the threshold voltage of the switching component 110 can be compensated.

Figure 4:
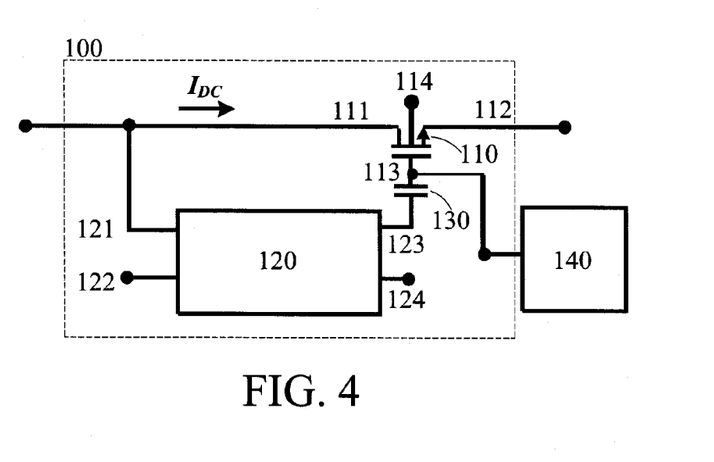
FIG. 4 is a schematic circuit of the current-rectifying device having a biasing circuit according to an embodiment of the present invention.

As illustrated in FIG. 4, a biasing circuit 140 electrically connected to the high-impedance control node 113 is provided for reducing an effective threshold voltage of the FET. In this embodiment, the high-impedance control node 113 and the positive output node 123 can be electrically connected through a capacitor 130, such that only the AC voltage swing from the impedance transformer 120 can be permitted to the high-impedance control node 113. In other words, DC signal from the positive output node 123 is suppressed by the capacitor 130. Although the biasing circuit 140 illustrated in FIG. 4 is implemented by a NMOS configuration, various modifications to achieve an equivalent biasing function can be made by persons skilled in the art. For example, in an embodiment, the NMOS transistor can be replaced with a PMOS transistor upon different biasing needs.

Figure 5:
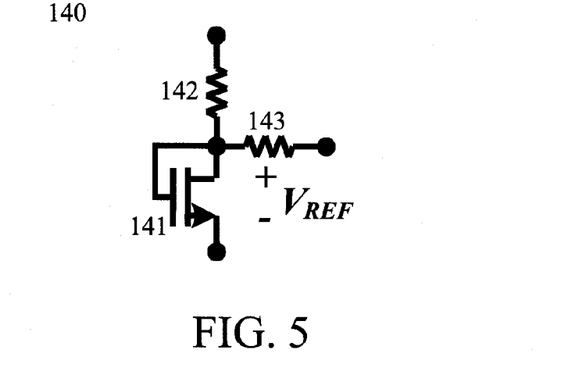
FIG. 5 is a schematic circuit of the biasing circuit of FIG. 4.

In an embodiment, as shown in FIG. 5, the biasing circuit 140 includes a diode-electrically connected transistor 141, a first resistor 142 and a second resistor 143. The first resistor 142 is electrically connected to the diode-electrically connected transistor 141 to provide a bias voltage $V_{REF}$ when a current generated by the diode-electrically connected transistor 141 flows through the first resistor 142. Also, the second resistor 143 is electrically connected to a node between the diode-electrically connected transistor 141 and the first resistor 142, such that when another end of the second resistor 143 is electrically connected to the high-impedance control node 113, the second resistor 143 can prevent the biasing circuit 140 from affecting the AC voltage swing from the impedance transformer 120.

In an embodiment, the impedance transformer presents a substantial 0° phase shift if the switching device 110 is typical, and presents a substantial 180° phase shift if the switching device 110 is complementary. It should be appreciated that the switching device 110 is typical if a greater control voltage increases the switching conductance thereof, while the witching device 110 is complementary if a greater control voltage decreases the switching conductance thereof.

Figure 6:
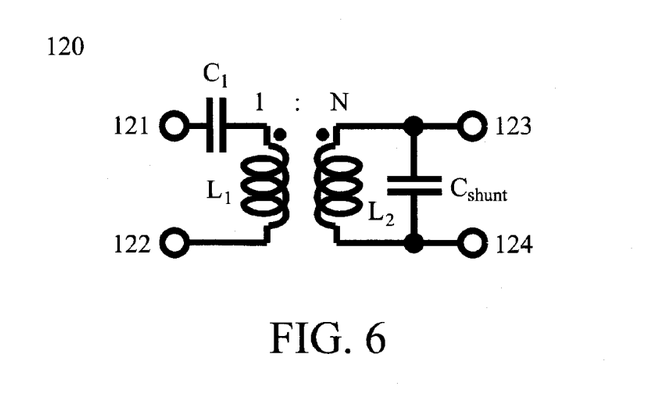
FIG. 6 is a schematic circuit of an impedance transformer according to an embodiment of the present invention.

FIG. 6 is a schematic circuit of the impedance transformer 120 according to an embodiment of the present invention. The impedance transformer 120 presents a differential mode configuration, and the sign of voltage gain can be swapped by exchanging the positive output node 123 and the negative output node 124, such that the outputted voltage swing is in phase with the conductance between the first node 111 and the second node 112.

In an embodiment, the impedance transformer 120, as illustrated in FIG. 6, includes a transformer unit, a first input capacitor $C_1$ and a shunt capacitor $C_{shunt}$. The transformer unit has a first coil $L_1$ and a second coil $L_2$. A turn ratio of the first coil $L_1$ to the second coil $L_2$ is 1 to a positive number N. The first input capacitor $C_1$ is electrically and serially connected between the positive input node 121 and the first coil $L_1$, and the shunt capacitor $C_{shunt}$ is electrically connected between the positive output node 123 and the negative output node 124 and is parallel to the second coil $L_2$.

In an embodiment, the impedance transformer 120 further includes a second input capacitor $C_2$ electrically and serially connected between the negative input node 122 and the first coil $L_1$. Also, in an embodiment, the shunt capacitor $C_{shunt}$ can be a parasitic capacitor contributed from an output load thereof.

Figure 7:
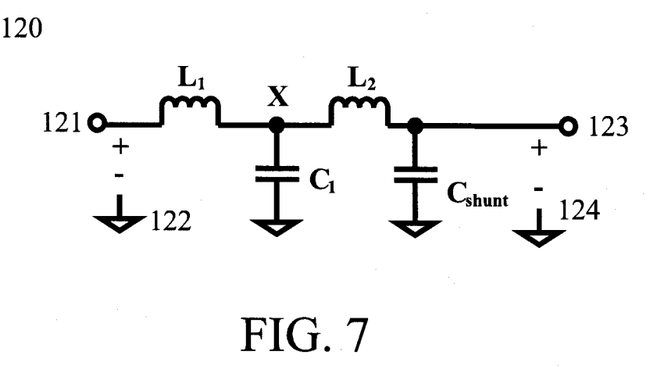
FIG. 7 is a schematic circuit of the impedance transformer according to an embodiment of the present invention.

Further, as shown in FIG. 7, the impedance transformer 120 presents a common mode (single-ended) configuration, where the negative input node 122 and the negative output node 124 can be electrically connected, and the impedance transformer 120 provides an out-of-phase voltage transfer function at some high frequencies, i.e., providing an 180° phase shift. In addition, it is possible for the impedance transformer 120 to provide an in-phase voltage transfer function at some very low frequencies, i.e., providing a 0° phase shift.

In an embodiment, the impedance transformer 120, as illustrated in FIG. 7, includes a first inductor $L_1$, a second inductor $L_2$, a first shunt capacitor $C_1$ and a second shunt capacitor $C_{shunt}$. The first inductor $L_1$ is electrically connected to the positive input node 121. The second inductor $L_2$ is electrically and serially connected between the first inductor $L_1$ and the positive output node 123. The first shunt capacitor $C_1$ is electrically connected across an internal node X, which is electrically and serially connected between the first inductor $L_1$ and the second inductor $L_2$, and the negative input node 122. The second shunt capacitor $C_{shunt}$ is electrically connected between the positive output node 123 and the negative output node 124. In an embodiment, the shunt capacitor $C_{shunt}$ can be a parasitic capacitor contributed from an output load thereof.

Figure 8:
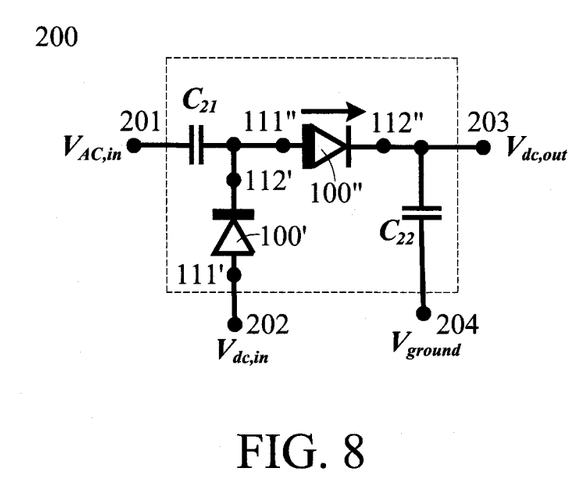
FIG. 8 is a schematic circuit of a rectifier according to the present invention.

FIG. 8 is a schematic circuit of a rectifier 200 according to the present invention. The rectifier 200 has an AC input node 201, a DC input node 202 for inputting a DC voltage signal $V_{dc,\,in}$, a DC output node 203 for outputting a DC voltage signal $V_{dc,\,out}$ and a ground node 204 for connecting to a grounding voltage signal $V_{ground}$, and converts AC signals to an output DC current. The rectifier 200 further includes first and second current-rectifying devices 100' and 100" according to an embodiment mentioned above and first and second capacitors $C_{21}$ and $C_{22}$.

Since the current-rectifying device 100 performs a function similar to a traditional diode but with reduced effective forward voltage drop and reverse leakage current and an increased forward current, the current-rectifying devices are presented with a symbol similar to a diode, where a thick line is on the first node or the second node of the current-rectifying device to identify a terminal with greater AC voltage swing. For example, as illustrated in FIG. 8, a thick line is on the second node 112' of the first current-rectifying device 100' and a thick line is on the first node 111" of the second current-rectifying device 100". The positive input node 121 of the impedance transformer 120 is typically connected to either the first node 111 or the second node 112 whichever has the maximum voltage swing to achieve best current-rectifying performance. These symbols are used in later figures.

As shown in FIG. 8, the first node 111' of the first current-rectifying device 100' is electrically connected to the DC input node 202, the second node 112' of the first current-rectifying device 100' is electrically connected to another end of the first capacitor $C_{21}$, the first node 111" of the second current-rectifying device 100" is electrically connected to the another end of the first capacitor $C_{21}$, and the second node 112" of the second current-rectifying device 100" is electrically connected to the DC output node 203. Also, the second capacitor $C_{22}$ is electrically connected across the DC output node 203 and the ground node 204. As such, when an input AC voltage signal $V_{AC,in}$ is applied to the AC input node 201, an output DC current is obtained at the DC output node 203, and an output DC voltage signal $V_{dc,\,out}$ can be accordingly obtained with a load loaded to the DC output node 203. In an embodiment, at least one of the switching components 110 of the first and second current-rectifying devices 100' and 100" further comprises a bias node for adjusting the conductance between the first node 111', 111" and the second node 112', 112" of the first and second current-rectifying devices 100' and 100", respectively.

In the embodiment shown in FIG. 8, two current-rectifying devices 100' and 100" are employed to accomplish the rectifier 200. However, each impedance transformer of the current-rectifying devices 100' and 100" may occupy a significant space or layout area and increase the cost. Accordingly, in an embodiment shown in FIG. 9 the impedance transformers 120 can be merged into one equivalent impedance transformer 220, such that an AC output voltage swing from the equivalent impedance transformer 220 is shared by using AC coupling capacitors 225 and 226 electrically connected between equivalent output nodes of the equivalent impedance transformer 220 and the high impedance control nodes 113' and 113" of the switching components 110' and 110" in the first and second current-rectifying devices 100' and 100".

Figure 10:
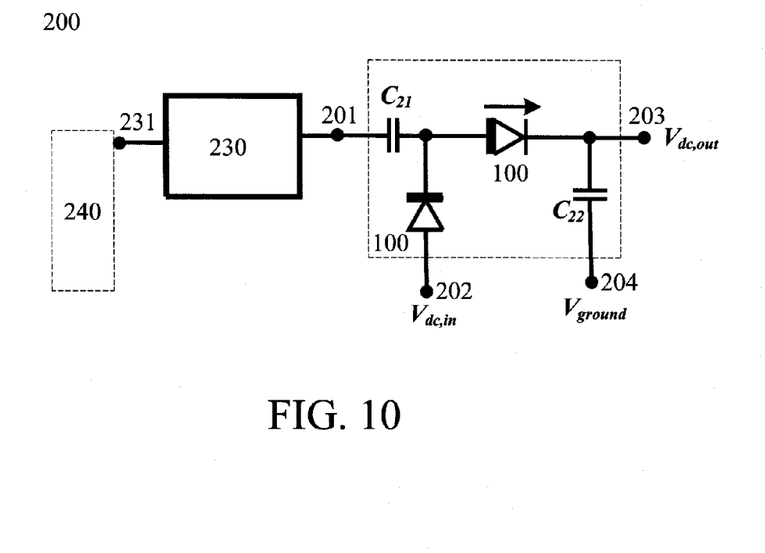
FIG. 10 is a schematic circuit of the rectifier according to an embodiment of the present invention.

FIG. 10 is a schematic circuit of the rectifier 200 according to an embodiment of the present invention. As shown in FIG. 10, the rectifier 200 further comprises an RF input node 231 for electrically connecting an external RF source 240 and a matching network 230. The matching network 230 is electrically connected to the RF input node 231 for matching the external RF source 240 from the RF input node 231 to the AC input node 201, so as to reduce a power reflection from the AC input node 201. Since the means for matching an external RF source from an RF input node to an AC input node is well-known in the art, specific description regarding the matching network 230 is hereby omitted.

Figure 11:
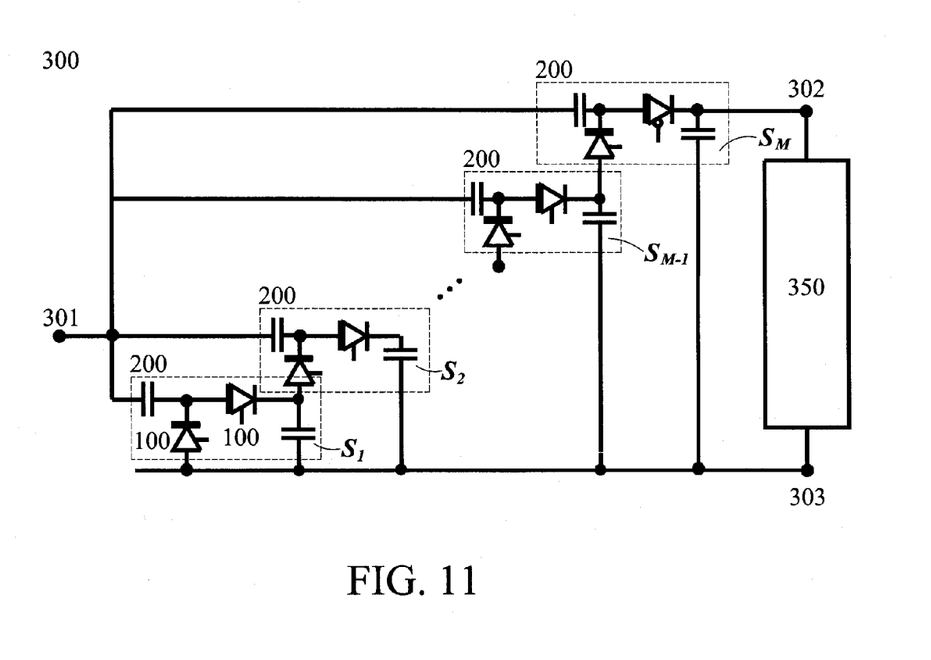
FIG. 11 is a schematic circuit of a multi-stage rectifier according to the present invention.

FIG. 11 is a schematic circuit of a multi-stage rectifier 300 according to the present invention. The multi-stage rectifier 300 has a multi-stage AC input node 301, a multi-stage DC positive output node 302 and a multi-stage DC negative output node 303, and converts AC signals to an output DC current. As shown in FIG. 11, the multi-stage rectifier 300 includes a plurality of rectifiers 200 according to an embodiment mentioned above which are electrically connected in a cascade configuration. In the cascade configuration, the DC input node 202 of the rectifier 200 of a first stage $S_1$ is electrically connected to the multi-stage DC negative output node 303, the DC output node 203 of the rectifier 200 of a next stage other than a last stage $S_M$, i.e., one of stages $S_1$-$S_{M-1}$, is electrically connected to the DC input node 202 of the rectifier 200 of a succeeding stage which can be one of stages $S_2$-$S_M$, the DC output node 203 of the rectifier 200 of the last stage $S_M$ is electrically connected to the multi-stage DC positive output node 302, and the AC input nodes 201 of the rectifiers 200 of respective stages $S_1$-$S_M$ are electrically connected to the multi-stage AC input node 301. Therefore, when an input AC voltage signal is applied to the multi-stage AC input node 301, an output DC current is obtained at the DC output node 302, and an output DC voltage can be accordingly obtained with a load 350 electrically connected between the multi-stage DC positive output node 302 and the multi-stage negative output node 303. In an embodiment, at least one of the switching components 110 of the first and second current-rectifying devices 100', 100" further comprises a bias node for adjusting the conductance between the first node 111 and the second node 112.

Figure 12:
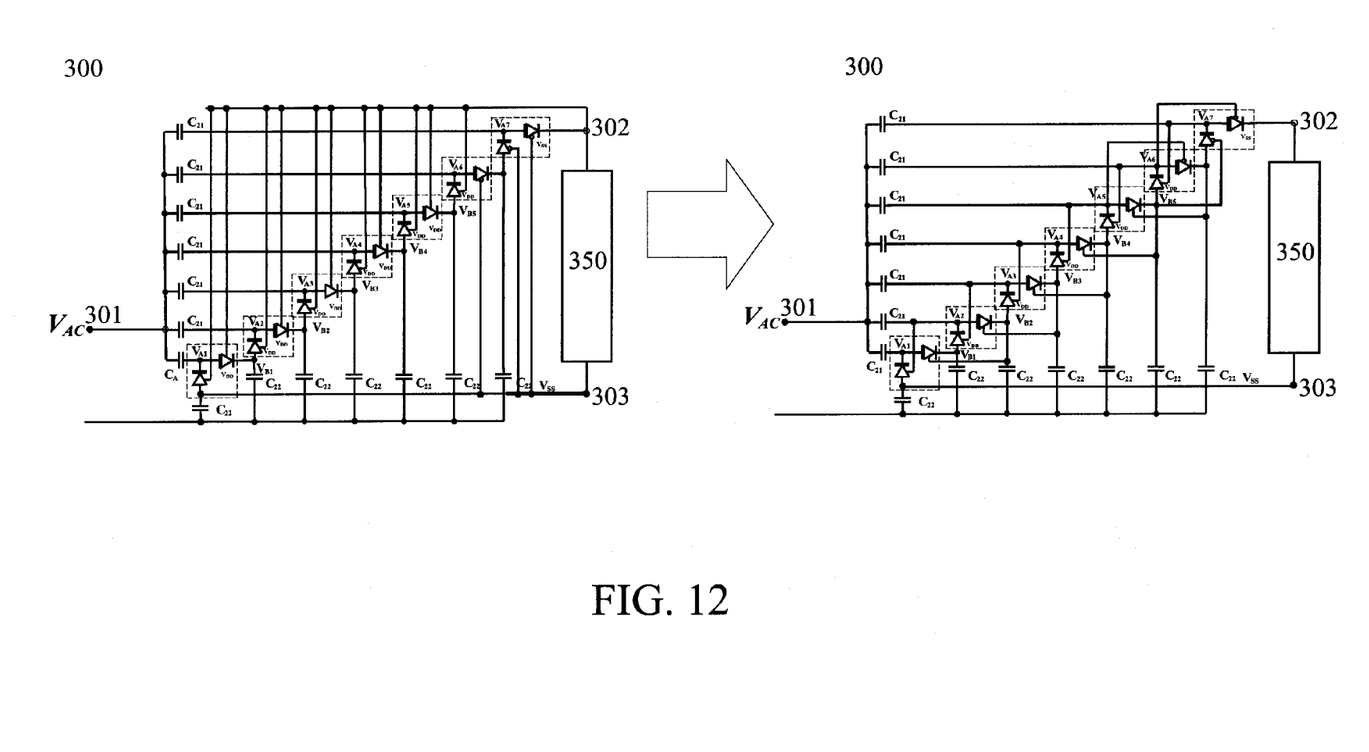
FIG. 12 is a schematic circuit of a multi-stage rectifier according to an embodiment of the present invention.

Typically, the bias nodes in the multi-stage rectifier 300 are biased by the multi-stage positive output node 302 with voltage $V_{DD}$ or the multi-stage negative output node 303 with voltage $V_{SS}$ as shown in the left part of FIG. 12. In an embodiment, in order to further reduce DC power consumption of the multi-stage rectifier 300, the voltage applying to each of the bias nodes is not limited to the voltage $V_{DD}$ at the multi-stage positive output node 302 or the voltage $V_{SS}$ at the multi-stage negative output node 303. For example, in an exemplary 7-stages rectifier 300, each of the bias nodes of the switching components 110 in one rectifier 200 can be connected in a progressive manner to one of the DC output nodes 203 with voltages $V_{B1}$ to $V_{B5}$ or one of the AC input nodes 201 with voltages $V_{A1}$ to $V_{A7}$ of another rectifier 200 as shown in the right part of FIG. 12. It should be appreciated that although FIG. 12 illustrates an exemplary multi-stage rectifier 300 with 7 stages, the number of stages of the multi-stage rectifier 300 is not limited to seven. In fact, the number M of stages can be any number selected by persons skilled in the art.

Figure 9:
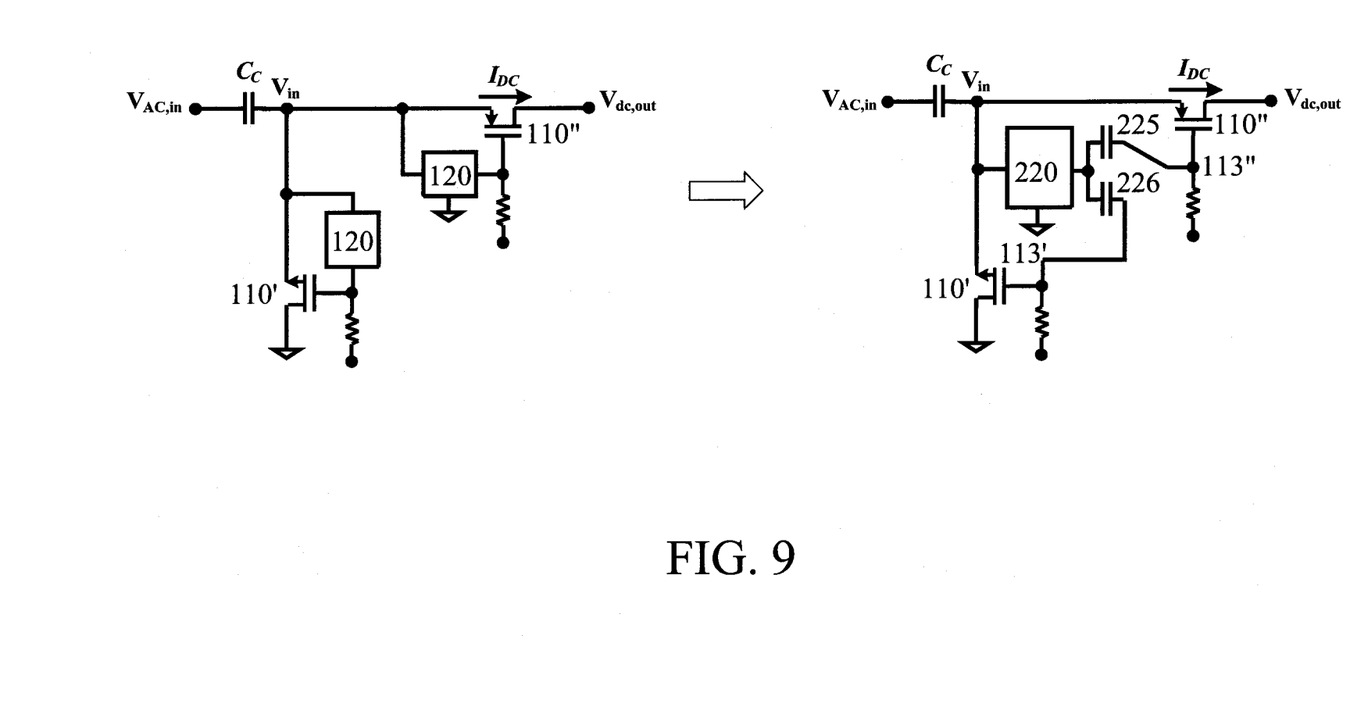
FIG. 9 is a schematic circuit of the rectifier according to an embodiment of the present invention.
Figure 13:
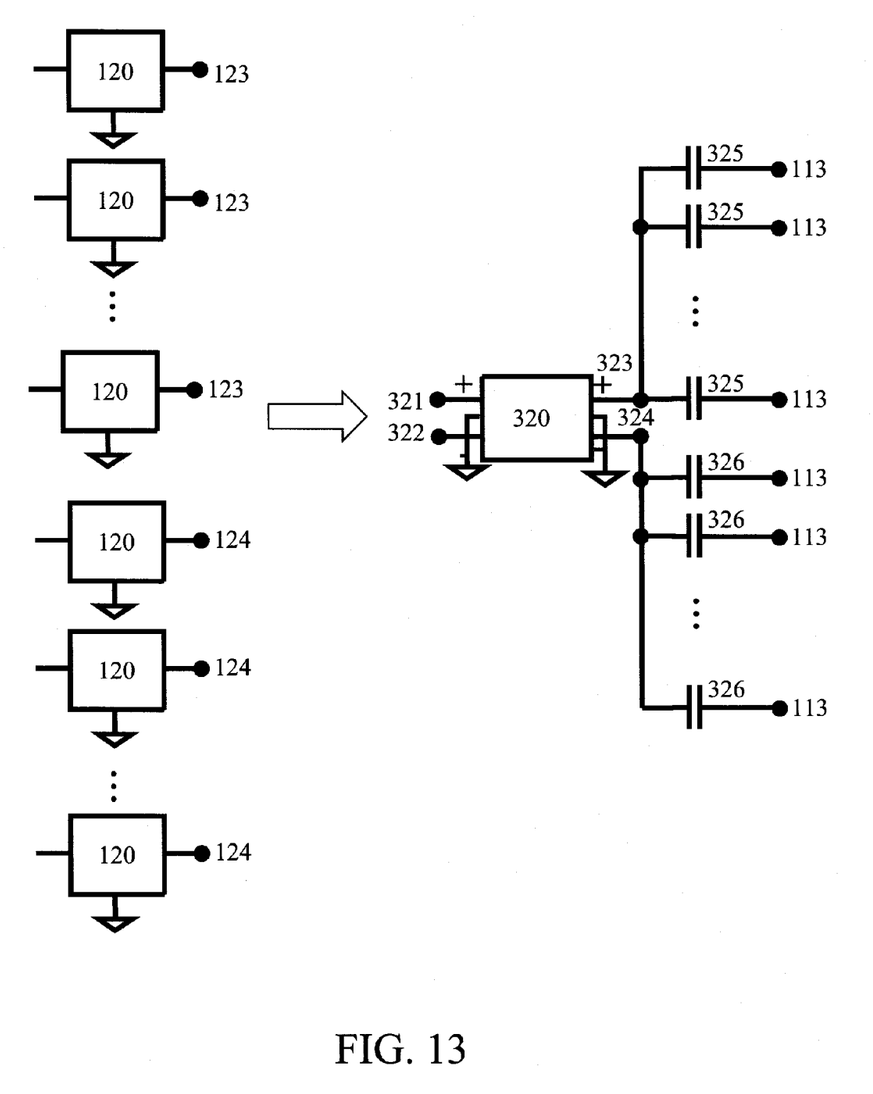
FIG. 13 is a scheme view of an equivalent impedance transformer according to an embodiment of the present invention.

In the embodiment shown in FIG. 13, similar to the embodiment shown in FIG. 9, the respective impedance transformers 120 in the multi-stage rectifier 300 can be merged into one equivalent impedance transformer 320 having an equivalent positive input node 321, equivalent negative input node 322, equivalent positive output node 323 and equivalent negative output node 324, such that an AC output voltage swing from the equivalent impedance transformer 320 is shared by using multiple AC coupling capacitors 325, 326 electrically connected between equivalent output nodes of the equivalent impedance transformer 320 and the high impedance control nodes 113 of the switching components 110 in the current-rectifying devices 100 of the rectifiers 200.

Specifically, in a multi-stage rectifier with both typical and complementary switching component, the impedance transformer 120 of these current rectifying devices 200 can be categorized based on their relative input and output phases. Generally, the impedance transformers 120 can be categorized into four substantial cases as the followings based on the phases of the impedance transformer's input and output voltage swing:

1.) In-phase input, in-phase output
2.) In-phase input, out-of-phase output
3.) Out-of-phase input, in-phase output
4.) Out-of-phase input, out-of-phase output The impedance transformers 120 can be merged by carrying a two-step procedure. In a first step, the impedance transformers 120 are categorized based on the four cases above. Then, a second step of merging is carried to obtain an equivalent impedance transformer 320. For example, all in-phase outputs are electrically connected to the equivalent positive output node 323, all out-of-phase outputs are electrically connected to the equivalent negative output node 324, all in-phase inputs are electrically connected to the equivalent positive input node 321, and all of out-of-phase inputs are electrically connected to the equivalent negative input node 322.

Figure 14:
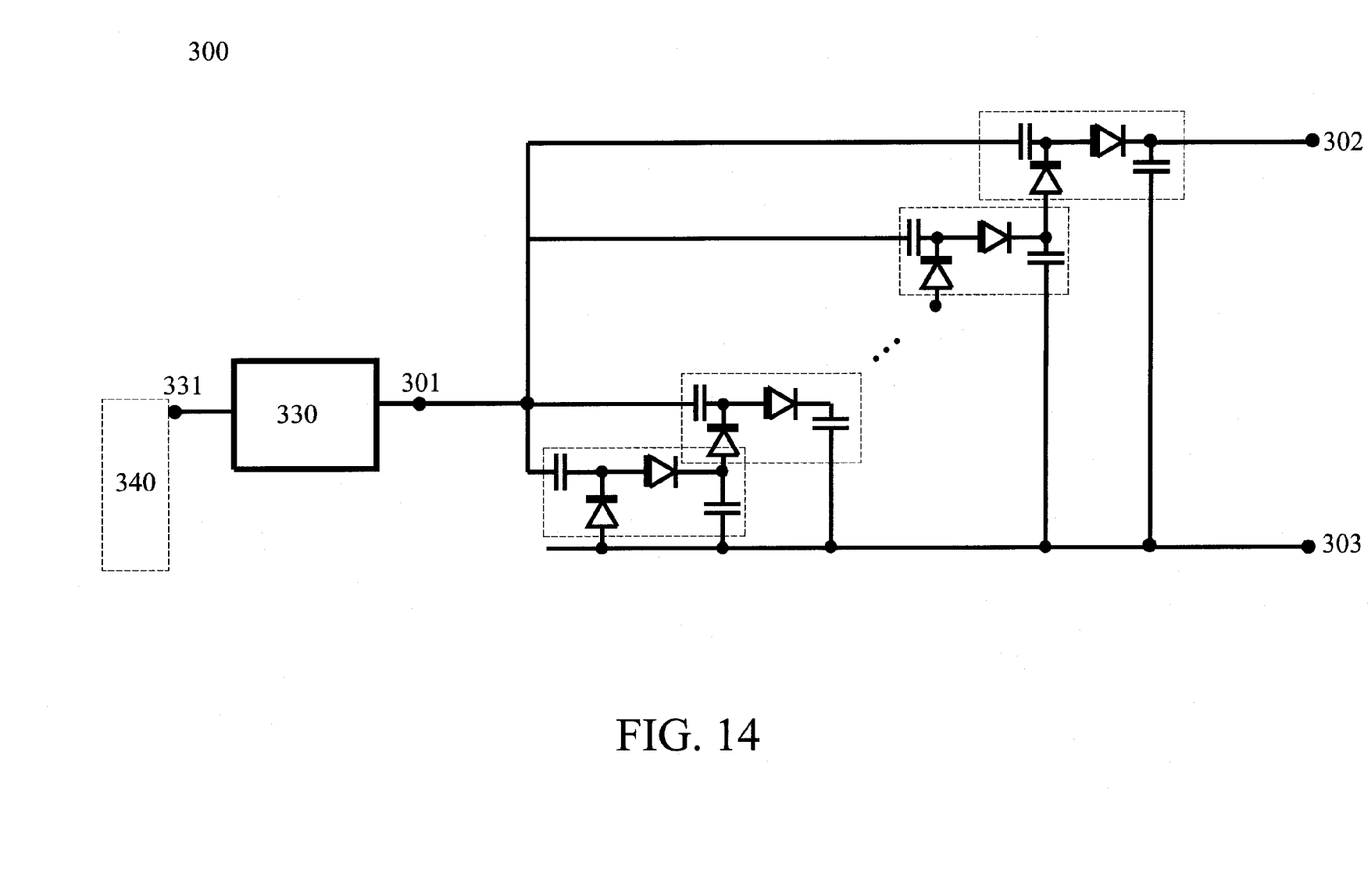
FIG. 14 is a schematic circuit of the multi-stage rectifier according to an embodiment of the present invention.

FIG. 14 is a schematic circuit of the multi-stage rectifier 300 according to an embodiment of the present invention. As shown in FIG. 14, the multi-stage rectifier 300 further comprises an RF input node 331 for electrically connecting an external RF source 340 and a matching network 330. The matching network 330 is electrically connected to the RF input node 331 for matching the external RF source 340 from the RF input node 331 to the AC input node 301, so as to reduce a power reflection from the AC input node 301. Since the means of matching an external RF source from an RF input node to an AC input node is well-known in the art, specific description regarding the matching network 330 is hereby omitted.

From the foregoing, the present invention provides a current-rectifying device which reduces the effective forward voltage drop and the leakage current, and increases the forward current by employing an impedance transformer. As such, when the current-rectifying device is used to form the IGR, the rectifier achieves improved sensitivity and efficiency.

The above examples are only used to illustrate the principle of the present invention and the effect thereof, and should not be construed as to limit the present invention. The above examples can all be modified and altered by those skilled in the art, without departing from the spirit and scope of the present invention as defined in the following appended claims.

What is claimed is:

1. A current-rectifying device which permits a current to flow in one direction when driven by an AC input voltage, comprising:
   a switching component including a first node, a second node, a control-reference node and a high-impedance control node, wherein a conductance between the first node and the second node is controlled based on a voltage between the high-impedance control node and the control-reference node; and
   an impedance transformer including a positive input node, a negative input node, a positive output node and a negative output node, wherein the positive input node is electrically connected to one of the first node and the second node based on AC voltage swings thereof, and the positive output node is electrically connected to the high-impedance control node, such that the impedance transformer senses an AC voltage swing derived from the AC input voltage with the positive input node and the negative input node, and provides an AC voltage swing between the high-impedance control node and the control-reference node that is greater than the AC voltage swing derived from the AC input voltage, and an AC voltage swing between the first node and the second node is substantially in phase with the conductance therebetween to permit the current driven by the AC input voltage to flow in the direction from the first node to the second node.

2. The current-rectifying device of claim 1, wherein the switching component is a field-effect transistor (FET), a bulk node of the FET serves as the control-reference node, and a gate node of the FET serves as the control node.

3. The current-rectifying device of claim 2, further comprising a biasing circuit electrically connected to the high-impedance control node for reducing an effective threshold voltage of the FET, wherein the high-impedance control node and the positive output node are electrically connected through a capacitor.

4. The current-rectifying device of claim 3, wherein the biasing circuit comprises:
   a diode-electrically connected transistor;
   a first resistor electrically connected to the diode-electrically connected transistor to provide a bias voltage when a current generated by the diode-electrically connected transistor flows through the first resistor; and
   a second resistor electrically connected to a node between the diode-electrically connected transistor and the first resistor.

5. The current-rectifying device of claim 1, wherein the switching component is a bipolar-junction transistor (BJT), and a base node of the BJT serves as the high impedance control node.

6. The current-rectifying device of claim 1, wherein the first node is an anode, and the second node is a cathode.

7. The current-rectifying device of claim 1, wherein the control-reference node is electrically connected to one of the first node and the second node based on a conducting type of the switching component.

8. The current-rectifying device of claim 1, wherein the switching component further comprises a bias node for adjusting the conductance between the first node and the second node.

9. The current-rectifying device of claim 1, wherein the AC voltage swing between the positive input node and the negative input node is amplified through the impedance transformer to become a greater AC voltage swing between the positive output node and the negative output node when a parasitic impedance from the high-impedance control node is loaded.

10. The current-rectifying device of claim 9, wherein the impedance transformer presents a substantially 0° or 180° phase shift based on a phase of the AC voltage swing between the positive input node and the negative input node.

11. The current-rectifying device of claim 9, wherein the impedance transformer comprises:
   a transformer unit having a first coil and a second coil, wherein a turn ratio of the first coil to the second coil is 1 to a positive number N;

a first input capacitor electrically and serially connected between the positive input node and the first coil; and
a shunt capacitor electrically connected between the positive output node and the negative output node and parallel to the second coil.

12. The current-rectifying device of claim 11, wherein the shunt capacitor is a parasitic capacitor contributed from an output load thereof.

13. The current-rectifying device of claim 11, further comprising a second input capacitor electrically and serially connected between the negative input node and the first coil.

14. The current-rectifying device of claim 11, wherein the negative output node is electrically connected to the negative input node.

15. The current-rectifying device of claim 9, wherein the negative output node is electrically connected to the negative input node.

16. The current-rectifying device of claim 15, wherein the impedance transformer comprises:
a first inductor electrically connected to the positive input node;
a second inductor electrically and serially connected between the first inductor and the positive output node;
a first shunt capacitor electrically connected across an internal node, electrically and serially connected between the first inductor and the second inductor, and the negative input node; and
a second shunt capacitor electrically connected between the positive output node and the negative output node.

17. A rectifier, which converts AC signals to an output DC current, the rectifier comprising:
an AC input node;
a first capacitor with one end electrically connected to the AC input node;
a DC input node;
a first current-rectifying device according to claim 1, wherein the first node of the first current-rectifying device is electrically connected to the DC input node, and the second node of the first current-rectifying device is electrically connected to the other end of the first capacitor;
a DC output node;
a second current-rectifying device according to claim 1, wherein the first node of the second current-rectifying device is electrically connected to the other end of the first capacitor, and the second node of the second current-rectifying device is electrically connected to the DC output node;
a ground node; and
a second capacitor electrically connected across the DC output node and the ground node.

18. The rectifier of claim 17, wherein at least one of the switching components of the first and second current-rectifying devices further comprises a bias node for adjusting the conductance between the first node and the second node.

19. The rectifier of claim 17, wherein the impedance transformer of the first current-rectifying device and the impedance transformer of the second current-rectifying device are merged into one equivalent impedance transformer, such that an AC output voltage swing of the equivalent impedance transformer is shared by using AC coupling capacitors electrically connected between equivalent output nodes of the equivalent impedance transformer and the high impedance control nodes of the switching components in the first and second current-rectifying devices.

20. The rectifier of claim 17, further comprising:
an RF input node for electrically connected to an external RF source; and
a matching network electrically connected to the RF input node for matching the external RF source from the RF input node to the AC input node, to reduce a power reflection from the AC input node.

21. A multi-stage rectifier, which converts AC signals to an output DC current, each rectifier being constructed according to the rectifier of claim 17, the multi-stage rectifier comprising:
a multi-stage AC input node;
a multi-stage DC positive output node;
a multi-stage DC negative output node;
a first rectifier, wherein the DC input node of the first rectifier is electrically connected to the multi-stage DC negative output node; and
a second rectifier, wherein the DC output node of the first rectifier is electrically connected to the DC input node of the second rectifier, and the DC output node of the second rectifier is electrically connected to the multi-stage DC positive output node, and wherein the AC input nodes of the first and second rectifiers are electrically connected to the multi-stage AC input node.

22. The multi-stage rectifier of claim 21, further comprising a third rectifier electrically connected between the first rectifier and the second rectifier, wherein the output DC node of the first rectifier is electrically connected to the DC input node of the third rectifier, and the output DC node of the third rectifier is electrically connected to the DC input node of the second rectifier.

23. The multi-stage rectifier of claim 22, wherein at least one of the switching components further comprises a bias node for adjusting the conductance between the first node and the second node thereof.

24. The multi-stage rectifier of claim 23, wherein at least one of the bias node of the switching component is biased by a node which is not one of the multi-stage DC positive output node, and the multi-stage DC negative output node according to a conducting type of the switching component.

25. The multi-stage rectifier of claim 21, wherein the impedance transformers of the current-rectifying devices are merged into one equivalent impedance transformer, such that AC output voltage swings of the impedance transformers are shared by using AC coupling capacitors electrically connected between equivalent output nodes of the equivalent impedance transformer and the high impedance control nodes of the switching components in the current-rectifying devices.

26. The multi-stage rectifier of claim 21, further comprising:
an RF input node; and
means for electrically connecting an external RF source to the RF input node, and matching the external RF source from the RF input node to the multi-stage AC input node to reduce a power reflection from the multi-stage AC input node.

27. A method for permitting a current to flow in one direction when driven by an AC input voltage, comprising:
providing a switching component, which has a first node, a second node and a control node;
electrically connecting the first node to the AC input voltage;
electrically connecting an impedance transformer to one of the first node and the second node based on AC voltage swings thereof; and outputting an AC voltage swing substantially in phase with a conductance of the switching component from the impedance transformer to the control node of the switching component, wherein the impedance transformer includes a positive input node, a negative input node, a positive output node and a negative output node, the positive input node is electrically connected to one of the first node and the second node based on the AC voltage swings thereof, and the positive output node is electrically connected to the high-impedance control node, such that the impedance transformer senses the AC voltage swing derived from the AC input voltage with the positive input node and the negative input node, and provides an AC voltage swing between the high-impedance control node and a control-reference node that is greater than the AC voltage swing derived from the AC input voltage, and an AC voltage swing between the first node and the second node is substantially in phase with the conductance therebetween to permit the current driven by the AC input voltage to flow in the direction from the first node to the second node.

\* \* \* \* \*